UNITED STATES PATENT OFFICE.

ZENO OSTENBERG, OF SAN JOSE, CALIFORNIA.

PROCESS OF DISSOLVING CELLULOSE.

1,315,393.  Specification of Letters Patent.  Patented Sept. 9, 1919.

No Drawing.  Application filed November 1, 1916. Serial No. 128,963.

*To all whom it may concern:*

Be it known that I, ZENO OSTENBERG, a citizen of the United States, and resident of San Jose, in the county of Santa Clara and State of California, have invented a certain new and useful Improvement in Processes of Dissolving Cellulose, of which the following is a specification.

My invention relates to the process of producing solutions of cellulose by dissolving cellulose in suitable mixtures of hydrochloric acid, sulfuric acid and phosphoric acid, reference being made to my Patent No. 1,218,954, dated March 13, 1917.

The use of highly concentrated hydrogen chlorid solution in the process of dissolving cellulose renders that process somewhat expensive, and the use of the gas to form this concentrated acid renders the process inconvenient, complicated, undesirable and expensive. In my improved process I obviate the necessity of using hydrogen chlorid in the gaseous form by substituting therefor concentrated sulfuric and phosphoric acids. Hydrochloric acid of a lower concentration than the acid of commerce (35.5% to 37.5% HCl) may be utilized in the same way by the addition of sufficient concentrated sulfuric and phosphoric acids. In fact acids ranging in concentration from 25% HCl to 39% HCl have been utilized by me. Solutions of cellulose up to 17% in concentration may be obtained by dissolving the cellulose in the proper acid mixture at a temperature below 50° C. The greater concentration of hydrochloric acid the greater is the amount of cellulose dissolved. The solutions obtained are useful in the arts and sciences since the cellulose may be recovered in a number of ways or it may be allowed to hydrolyze and the glucose formed by hydrolysis may be recovered or fermented to alcohol. The mode of application of these acid mixtures is varied depending on the result desired.

The following example, which is merely illustrative and in no way is to be understood as limiting my patent, will serve to make clear some of its uses. The acid mixtures are made by mixing concentrated acids of commerce in vessels supplied with suitable means for cooling.

In replacing part of the hydrogen chlorid in concentrated solutions by a mixture of sulfuric and phosphoric acids for the purpose of forming a cellulose solvent I have found that 1½ parts of sulfuric acid (100%) or 2 parts of phosphoric acid (100%) are equivalent to 1 part of hydrogen chlorid.

Example: I kilogram of air-dried cotton is kneaded with about 6 kilograms of a mixture of hydrochloric acid (35% HCl) 9 parts, sulfuric acid (99%) ½ part, and phosphoric acid (85%) 2 parts, all by weight. the solution is cooled to prevent escape of HCl. A thick viscid mass results which may be clarified and then forced through nozzles into a suitable coagulating bath, as water, dilute acids, solutions of various salts, solutions of colloids and various other media such as alcohol etc.

In the term "cellulose" is included the so-called oxycelluloses and hydrocelluloses and ligno-cellulose. Lignin is insoluble in the acid mixtures used and is left undissolved when such materials as wood is used as a cellulose containing material.

I claim:—

The process of dissolving cellulose in a mixture of hydrochloric acid, sulfuric acid and phosphoric acid.

In testimony whereof I have hereunto affixed my signature this 26th day of October, 1916.

ZENO OSTENBERG.